US012737672B2

(12) United States Patent
Ben Arie et al.

(10) Patent No.: US 12,737,672 B2
(45) Date of Patent: Sep. 15, 2026

(54) GRADIENT BASED ANOMALY DETECTION SYSTEM FOR TIME SERIES FEATURES

(71) Applicant: Intuit Inc., Mountain View, CA (US)

(72) Inventors: Aviv Ben Arie, Ramat Gan (IL); Or Basson, Tel Aviv (IL); Nitzan Bavly, Ganei Tikva (IL); Yair Horesh, Kfar-Saba (IL)

(73) Assignee: Intuit Inc., Mountain View, CA (US)

( * ) Notice: Subject to any disclaimer, the term of this patent is extended or adjusted under 35 U.S.C. 154(b) by 1112 days.

(21) Appl. No.: 17/512,887

(22) Filed: Oct. 28, 2021

(65) Prior Publication Data

US 2023/0137553 A1 May 4, 2023

(51) Int. Cl.
*G06N 20/00* (2019.01)

(52) U.S. Cl.
CPC .................................... *G06N 20/00* (2019.01)

(58) Field of Classification Search
CPC ...................................................... G06N 20/00
See application file for complete search history.

(56) References Cited

U.S. PATENT DOCUMENTS

2020/0007561 A1* 1/2020 Muddu .................. G06N 5/022
2020/0097810 A1* 3/2020 Hetherington ......... G06N 20/20

OTHER PUBLICATIONS

Munir “DeepAnT: A Deep Learning Approach for Unsupervised Anomaly Detection in Time Series”, 2018 (Year: 2018).*

* cited by examiner

*Primary Examiner* — Van C Mang
(74) *Attorney, Agent, or Firm* — Paradice & Li LLP

(57) ABSTRACT

Systems and methods for identifying suspected anomalies in time series data are disclosed. An example method may receiving time series data for at least one quantity, the time series data including values of the at least one quantity at each of a plurality of times, determining a list of gradients for the time series data, each gradient in the list of gradients based on two or more values of the time series data separated by a specified number of values of the time series data, deriving a plurality of statistics based on the determined list of gradients, and performing a supervised machine learning process based on the derived plurality of statistics to generate a trained machine learning model for identifying one or more suspected anomalies in the time series data.

16 Claims, 4 Drawing Sheets

GRADIENT BASED ANOMALY DETECTION SYSTEM FOR TIME SERIES FEATURES

TECHNICAL FIELD

This disclosure relates generally to detection of anomalies in time series data.

DESCRIPTION OF RELATED ART

Anomaly detection in time series data may be important in a variety of contexts. For example, the time series data may represent successful (or unsuccessful) login attempts associated with a specified user or website, withdrawals or deposits associated with a user's account, downloads of a particular file or stream, such as an audiovisual file or stream, views of a particular webpage, sales or inventory associated with a storefront, and so on. Efficient and explainable identification of such anomalies may be important for identifying fraud, errors in various systems, unexpected changes in sales or supply chains, and other issues which may be associated with the time series data.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a method for identifying suspected anomalies in time series data. An example method may be performed by a first computing device associated with one or more machine learning models and include receiving time series data for at least one quantity, the time series data including values of the at least one quantity at each of a plurality of times, determining a list of gradients for the time series data, each gradient in the list of gradients based on two or more values of the time series data separated by a specified number of values of the time series data, deriving a plurality of statistics based on the determined list of gradients, and performing a supervised machine learning process based on the derived plurality of statistics to generate a trained machine learning model for identifying one or more suspected anomalies in the time series data.

In some aspects, the method may also include identifying one or more suspected anomalies in subsequent values of the time series data using the trained machine learning model. In some aspects, the time series data includes a numeric vector having a plurality of indices, where each index contains a value of the time series data at a different time of the plurality of times. In some aspects, the method further includes selecting one or more parameters for determining the list of gradients, where the one or more parameters are selected using one or more machine learning processes. The one or more parameters may include a lookback period specifying a number of values of the time series data upon which the list of gradients is to be based. The one or more parameters may also include the specified number of values of the time series data. In some aspects, initial values of the one or more parameters are selected using a supervised machine learning process based on a first set of training data and the initial values of the one or more parameters are subsequently tuned using one or more tuning techniques.

Another innovative aspect of the subject matter described in this disclosure can be implemented in a system for identifying suspected anomalies in time series data. An example system is coupled to one or more machine learning models and includes one or more processors and a memory storing instructions for execution by the one or more processors. Execution of the instructions causes the system to perform operations including receiving time series data for at least one quantity, the time series data including values of the at least one quantity at each of a plurality of times, determining a list of gradients for the time series data, each gradient in the list of gradients based on two or more values of the time series data separated by a specified number of values of the time series data, deriving a plurality of statistics based on the determined list of gradients, and performing a supervised machine learning process based on the derived plurality of statistics to generate a trained machine learning model for identifying one or more suspected anomalies in the time series data.

In some aspects, execution of the instructions may also cause the system to identify one or more suspected anomalies in subsequent values of the time series data using the trained machine learning model. In some aspects, the time series data includes a numeric vector having a plurality of indices, where each index contains a value of the time series data at a different time of the plurality of times. In some aspects, the execution of the instructions causes the system to perform operations further including selecting one or more parameters for determining the list of gradients, where the one or more parameters are selected using one or more machine learning processes. The one or more parameters may include a lookback period specifying a number of values of the time series data upon which the list of gradients is to be based. The one or more parameters may also include the specified number of values of the time series data. In some aspects, initial values of the one or more parameters are selected using a supervised machine learning process based on a first set of training data and the initial values of the one or more parameters are subsequently tuned using one or more tuning techniques.

Another innovative aspect of the subject matter described in this disclosure can be implemented in a non-transitory computer-readable storage medium storing instructions for execution by one or more processors of a system coupled to one or more machine learning models. Execution of the instructions causes the system to perform operations including receiving time series data for at least one quantity, the time series data including values of the at least one quantity at each of a plurality of times, determining a list of gradients for the time series data, each gradient in the list of gradients based on two or more values of the time series data separated by a specified number of values of the time series data, deriving a plurality of statistics based on the determined list of gradients, and performing a supervised machine learning process based on the derived plurality of statistics to generate a trained machine learning model for identifying one or more suspected anomalies in the time series data.

In some aspects, execution of the instructions may also cause the system to identify one or more suspected anomalies in subsequent values of the time series data using the trained machine learning model. In some aspects, the time series data includes a numeric vector having a plurality of indices, where each index contains a value of the time series data at a different time of the plurality of times. In some aspects, the execution of the instructions causes the system to perform operations further including selecting one or more parameters for determining the list of gradients, where the one or more parameters are selected using one or more machine learning processes. The one or more parameters may include a lookback period specifying a number of values of the time series data upon which the list of gradients is to be based. The one or more parameters may also include the specified number of values of the time series data. In some aspects, initial values of the one or more parameters are selected using a supervised machine learning process based on a first set of training data and the initial values of the one or more parameters are subsequently tuned using one or more tuning techniques.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

Figure 1:
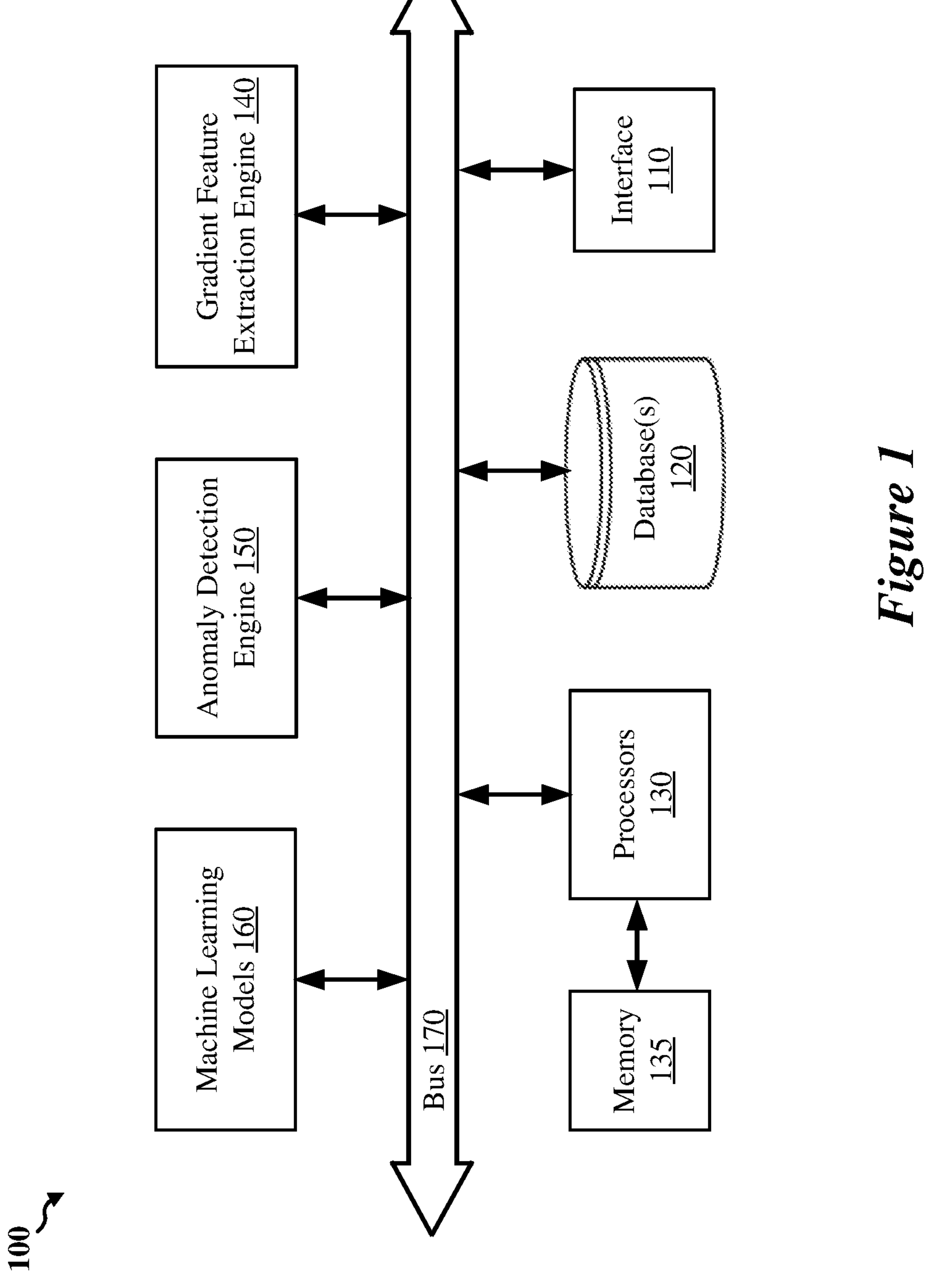
FIG. 1 shows a time series anomaly detection system, according to some implementations.

Implementations of the subject matter described in this disclosure may be used to identify anomalies in time series data through machine learning based processes. More particularly, the anomalies may be detected through machine learning based processing of gradient-based statistical analysis of the time series data. For example, time series data may be received representing values of a quantity at each of a plurality of times. Appropriate values of one or more parameters and related hyperparameters may be determined using one or more machine learning processes and associated training data. Such parameters may include a lookback period including a number of most recent values of the time series data, and a smoothing factor for determining gradients of the time series data. A plurality of gradients of the time series may be determined based on the parameters, and then a number of statistics of the determined gradients may be derived. These derived statistics may be used with one or more supervised machine learning processes to identify suspected anomalies in the timer series data. These and other aspects of the example implementations are discussed further below.

Various implementations of the subject matter disclosed herein provide one or more technical solutions to the technical problem of identifying anomalies in time series data in an explainable and efficient manner. Example implementations may receive time series data for at least one quantity, the time series data including values for the at least one quantity at each of a plurality of times, determine a list of gradients for the at least one quantity, where each gradient in the list of gradients are based on two or more values of the time series data separated by a specified number of values of the time series data, derive a plurality of statistics based on the determined list of gradients, and perform a supervised machine learning process based on the derived plurality of statistics to generate a trained machine learning model configured to identify one or more suspected anomalies in the time series data. This trained machine learning model may then be used to identify suspected anomalies in subsequent values of the time series data. More specifically, various aspects of the present disclosure provide a unique computing solution to a unique computing problem that did not exist prior to the development of machine learning techniques for identifying anomalies in time series data. As such, implementations of the subject matter disclosed herein are not an abstract idea such as organizing human activity or a mental process that can be performed in the human mind.

Moreover, various aspects of the present disclosure effect an improvement in the technical field of identifying time series data anomalies in an efficient and explainable manner. The use of machine learning models trained to detect anomalies based on derived statistics relating to gradients of the time series data may allow for more efficient and explainable identification of suspected anomalies in the time series data, allowing for the suspected anomalies to be detected efficiently and automatically but in a manner mimicking how a human expert might identify such anomalies. Training machine learning models and using such trained machine learning models for identifying suspected anomalies in time series data cannot be performed in the human mind, much less using pen and paper. In addition, implementations of the subject matter disclosed herein are usable with a wide variety of computing applications, and do far more than merely create contractual relationships, hedge risks, mitigate settlement risks, and the like, and therefore cannot be considered a fundamental economic practice.

FIG. 1 shows a time series anomaly detection system 100, according to some implementations. Various aspects of the time series anomaly detection system 100 disclosed herein may be applicable for identifying suspected anomalies in time series data using one or more trained machine learning models in a variety of computing applications. Such functionality may be useful for allowing users to detect the suspected anomalies in a wide variety of applications, such as identifying fraudulent logins and login attempts to various servers and websites, identifying fraudulent purchases or fraudulent withdrawals from banking or checking accounts, identifying unusual patterns in sales or inventory data, and so on.

The time series anomaly detection system 100 is shown to include an input/output (I/O) interface 110, a database 120, one or more data processors 130, a memory 135 coupled to the data processors 130, a gradient feature extraction engine 140, an anomaly detection engine 150, and one or more machine learning models 160. In some implementations, the various components of the time series anomaly detection system 100 may be interconnected by at least a data bus 170, as depicted in the example of FIG. 1. In other implementations, the various components of the time series anomaly detection system 100 may be interconnected using other suitable signal routing resources.

The interface 110 may include a screen, an input device, and other suitable elements that allow a user to provide information to the time series anomaly detection system 100 and/or to retrieve information from the time series anomaly detection system 100. Example information that can be provided to the time series anomaly detection system 100 may include configuration information for the time series anomaly detection system 100, such as information for configuring the gradient feature extraction engine 140 or anomaly detection engine 150, training data or one or more trained machine learning models for the machine learning model 160. Example information that can be retrieved from the time series anomaly detection system 100 may include data identifying suspected anomalies in the time series data, such as one or more messages identifying the suspected anomalies, one or more trained machine learning models, configuration information for the time series anomaly detection system 100, and the like.

The database 120, which may represent any suitable number of databases, may store any suitable information pertaining to configuration of the time series anomaly detection system 100, to users of the time series anomaly detection system 100. For example, the information may include configuration information for training one or more of the machine learning models 160, historical data such as historical time series data and anomalies identified in the historical time series data, and so on, and may include configuration information for the machine learning model 160. In some implementations, the database 120 may be a relational database capable of presenting the information as data sets to a user in tabular form and capable of manipulating the data sets using relational operators. In some aspects, the database 120 may use Structured Query Language (SQL) for querying and maintaining the database 120.

The data processors 130, which may be used for general data processing operations (such as manipulating the data sets stored in the database 120), may be one or more suitable processors capable of executing scripts or instructions of one or more software programs stored in the time series anomaly detection system 100 (such as within the memory 135). The data processors 130 may be implemented with a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the data processors 130 may be implemented as a combination of computing devices (such as a combination of a DSP and a microprocessor, a plurality of microprocessors, one or more microprocessors in conjunction with a DSP core, or any other such configuration).

The memory 135, which may be any suitable persistent memory (such as non-volatile memory or non-transitory memory) may store any number of software programs, executable instructions, machine code, algorithms, and the like that can be executed by the data processors 130 to perform one or more corresponding operations or functions. In some implementations, hardwired circuitry may be used in place of, or in combination with, software instructions to implement aspects of the disclosure. As such, implementations of the subject matter disclosed herein are not limited to any specific combination of hardware circuitry and/or software.

The gradient feature extraction engine 140 may determine gradients and various related features from time series data for use by the anomaly detection engine 150. the gradient feature extraction engine 140 may determine a plurality of gradients based on the time series data. For example, each gradient in the plurality of gradients may be determined based on a difference between two values of the time series data, such as two values of the time series data which are separated by a specified number of values of the time series data. More particularly, a gradient may be determined based on the difference between an n-th value of the time series data and an (n+k)-th value of the time series data, where k is an integer parameter selected and tuned using training data for identifying anomalies in the time series data. For example, such training data or configuration information may be retrieved from the database 120, from another memory coupled to the time series anomaly detection system 100, or via one or more networks coupled to the time series anomaly detection system 100. The gradient feature extraction engine 140 may then derive a plurality of features from the plurality of gradients. As discussed in more detail below, the gradient feature extraction engine 140 may derive features such as a maximum gradient value, a minimum gradient value, and a mean or median gradient value. The gradient feature extraction engine 140 may also determine an index of the time series data identifying where the derived features may be found, such as an index of the maximum or minimum value of the gradient.

The anomaly detection engine 150 may be used to identify suspected anomalies in the time series data using the gradients and related features determined by the gradient feature extraction engine 140 and using the trained machine learning models 160. As discussed further below, the anomaly detection engine 150 may receive the gradients and related features from the gradient feature extraction engine 140 and perform one or more supervised machine learning processes using the machine learning models 160 to generate a trained machine learning model configured to identify the suspected anomalies. The anomaly detection engine 150 may also use the trained machine learning models 160 to identify suspected anomalies in subsequent values of the time series data.

The machine learning models 160 may include any number of machine learning models that can be trained, using training data retrieved from the database 120 or another memory coupled to the time series anomaly detection system 100, to identify suspected anomalies in time series data. A machine learning model can take the form of an extensible data structure that can be used to represent sets of words or phrases and/or can be used to represent sets of attributes or features. The machine learning models may be trained with appropriate training data. For example, training data for identifying suspected anomalies may include one or more vectors of time series data and associated labels related to anomalies in the vectors of time series data. In some implementations, the machine learning models 160 may include supervised learning models such as a Logistic Regressor, Deep Neural Network (DNN) or XGBoost and may have any suitable architecture.

The particular architecture of the time series anomaly detection system 100 shown in FIG. 1 is but one example of a variety of different architectures within which aspects of the present disclosure may be implemented. For example, in other implementations, the time series anomaly detection system 100 may not include the gradient feature extraction engine 140, the functions of which may be implemented by the processors 130 executing corresponding instructions or scripts stored in the memory 135. In some other implementations, the functions of the anomaly detection engine 150 may be performed by the processors 130 executing corresponding instructions or scripts stored in the memory 135. Similarly, the functions of the machine learning models 160 may be performed by the processors 130 executing corresponding instructions or scripts stored in the memory 135.

Figure 2:
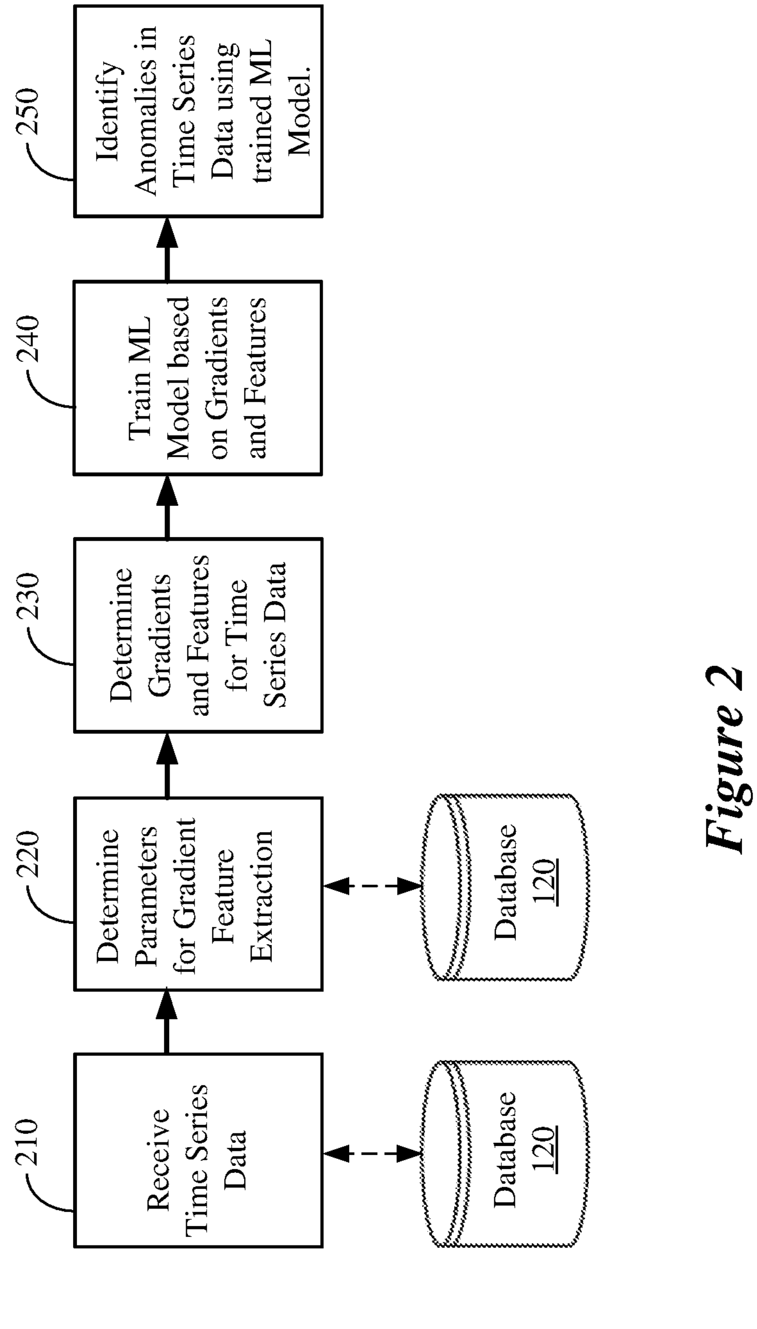
FIG. 2 shows a high-level overview of an example process flow that may be employed by the time series anomaly detection system of FIG. 1.

FIG. 2 shows a high-level overview of an example process flow 200 that may be employed by the time series anomaly detection system 100 of FIG. 1. In block 210, the time series anomaly detection system 100 receives time series data for at least one quantity, for example the time series data may be received via the interface 110 or retrieved from the database 120 or another memory coupled to the time series anomaly detection system 100. The time series data may include values of the at least one quantity at each of a plurality of times, such as a plurality of sequential hours, days, or weeks.

In block 220, the time series anomaly detection system 100 determines one or more parameters or hyperparameters for gradient feature extraction. For example, the one or more parameters and hyperparameters may be determined using the gradient feature extraction engine 140. The one or more parameters may include a lookback period representing a number n of most recent values of the time series data to be examined for suspected anomalies. The one or more parameters may also include a specified number k of values of the time series data, where k is a smoothing factor for the gradients to be determined from the time series data. More particularly, the gradients may be determined based on the difference between a value of the time series data, such as an n-th value of the time series data, and a k-th subsequent value of the time series data, such as an (n+k)-th value of the time series data. The lookback period n and the smoothing factor k may be determined based on training data retrieved from the database 120 or from another memory coupled to the time series anomaly detection system 100. For example, n and k may be determined based on the training data using one or more of the machine learning models 160, such as using a logistic regression based machine learning model, using XGBoost, or using one or more other supervised machine learning models. In some aspects, n and k may be determined using one or more supervised machine learning models and then tuned using grid search, random search, or another automated method.

In block 230, the time series anomaly detection system 100 determines a plurality of gradients and derives a plurality of features related to the determined gradients based on the time series data and the determined parameters, such as the parameters n and k. For example, the gradients and features may be determined from the time series data using the gradient feature extraction engine 140. The features may include a maximum gradient, a minimum gradient, a mean gradient, a median gradient, and may also include an index of the time series data identifying when in the time series data the feature occurred. For example, an index associated with the maximum gradient may identify the index of the time series data corresponding to the maximum gradient.

In block 240, the time series anomaly detection system 100 trains one or more machine learning models to identify suspected anomalies in the time series data based on the gradients and related derived features. For example, training the one or more machine learning models may include performing one or more supervised machine learning processes in order to generate a trained machine learning model configured to identify the suspected anomalies.

In block 250, the time series anomaly detection system 100 identifies one or more suspected anomalies in subsequent values of the time series data using the trained machine learning model. For example, the suspected anomalies may be determined using the anomaly detection engine 150 using one or more of the machine learning models 160.

Conventional techniques for identifying anomalies in time series data may incorporate algorithms such as autoregressive integrated moving average (ARIMA), vector autoregression moving average with exogenous regressors (VARMAX), long short-term memory (LSTM), Z-score anomaly detection, and so on. However, such techniques may not be easily interpretable, particularly LSTM, and may not be easily tunable for each application, such as techniques using ARIMA or VARMAX. Further, Z-score anomaly detection techniques may compare the most recent time frame to an entire distribution of the historical data, which may fail to capture the historical "peaks" and other transient features which often correspond to anomalies in the time series data, leading to inaccurate results. Moreover, Z-score anomaly detection techniques may require manually setting a threshold for a z-score of a percentile which is to be considered anomalous. This may be too simplistic in some use cases, as well as failing to generalize to more complicated data sets.

As discussed above, identifying anomalies in time series data may be important in a variety of contexts. For example, such time series data may include login attempts associated with one or more user's accounts, for example a banking, social media, commerce, or another account type. The anomalies may correspond to fraudulent logins or login attempts, may identify fraudulent purchases or fraudulent withdrawals from banking or checking accounts, and so on. Other examples of time series data may include geographical locations or internet protocol (IP) addresses associated with login attempts for a particular user's account. For example, anomalies associated with such data may include login attempts from locations or IP addresses associated with geographical locations where the user has not or does not regularly travel. Such time series data may also include device identifiers associated with login attempts for a particular user's account. Anomalies associated with such data may include login attempts from a new device, or from a device the user has not used recently. Further, the time series data may include sales data for a particular item or a particular storefront, where anomalies may indicate unexpected increases or decreases in sales. Identifying anomalies in these and other time series data may be important for a variety of uses, such as identifying fraudulent activity, identifying when a user is traveling or has purchased a new device, understanding changes in sales figures and rates of usage for websites and services, and so on.

The example implementations allow for automated identification of suspected anomalies in time series data to be performed accurately, efficiently, and explainably. This may enable automated detection of such anomalies to be performed accurately and also in a manner which is simple and also mimics how a human expert might examine the time series data for anomalies. This may enable much easier interpretation and tuning of the example implementations as compared with conventional techniques. More specifically, the example implementations may identify suspected anomalies by providing features derived from gradients of the time series data as input to supervised machine learning models. These features and gradients may be determined using parameters which have been identified and tuned using one or more machine learning processes.

In accordance with some example implementations, the time series data may be received, such as from a memory such as the database 120 or retrieved, such as via one or more network interfaces. Thus, the time series data includes a plurality of values of a quantity, such as a number of login attempts, IP addresses, geolocations, or similar, each value associated with a corresponding time. In some implementations the time series data may be collected and stored using a suitable data store such as Redis. Example implementations may model this the time series data as a numeric vector V, including a plurality of time indices each index representing a time, depending on the resolution of the time indices. For example, depending on the resolution, a subsequent index may indicate a subsequent week, day, or hour. For each index, the vector V may include a corresponding value of the quantity the time indicated by the index. In some aspects, there may be a maximum allowable number of indices, and thus a maximum number of values of the time series data which may be stored in the vector V. As discussed below, this maximum allowable number of indices may correspond to a maximum allowable lookback period, such that the example implementations may be adjustable, for example based on training data, to identify suspected anomalies in a lookback period less than or equal to this maximum allowable lookback period. In one example, the vector V may include 30 indices, each corresponding to a day, where each index includes an aggregated value of the time series data for the corresponding day. If the time series data represents a number of login attempts for a specific account, for example, then each index may include the aggregate number of login attempts which occur during that corresponding day.

After receiving the time series data and storing it as a vector V, one or more parameters and hyperparameters associated with the calculation of gradients and derivation of related features may be selected and tuned. For example, the parameters may include a lookback period n representing an integer number of recent indices of the vector V to be processed. That is, the lookback period indicates the number of recent values of the time series data for which suspected anomalies are to be identified. The parameters may also include an integer smoothing parameter k representing an integer number of indices of the vector V to be skipped when determining the gradient of a value of the time series data. More particularly, when determining the gradient of a j-th index of the time series data V[j], the gradient may be determined between V[j] and V[j+k]. Note that in some other implementations, the gradient may instead be determined between V[j−k] and V[j]. Appropriate values of the parameters n and k may be selected, along with related hyperparameters, using a supervised machine learning model such as a logistic regressor or XGBoost. In some aspects, this supervised machine learning model may select these values based on a first set of training data which may include a training vector Vt including time series training data and one or more anomaly labels relevant to the type of anomaly to be detected in the vector V. Note that anomaly label for the first set of training data may be different from the anomaly label for the vector V. In some aspects, the first set of training data may include a plurality of historical values of the time series data.

After selecting appropriate values of the parameters n and k, model performance may be automatically tuned over these two parameters in order to identify a most appropriate value for n and k. In some aspects, this tuning may be performed using a suitable technique such as grid search, random search, or another similar automated method.

After selecting and optimizing the parameters, such as the lookback period n and the smoothing factor k, the example implementations may generate a second set of training data using the selected and optimized parameters n and k. More particularly, the second set of training data may be generated to include features related to gradients of the time series data. The i-th quantity represented in the time series data, such as each IP address, geolocation, and so on, may be represented as a vector Vi. Each vector Vi may be truncated at the lookback period n. The gradients of the truncated vector Vi may then be determined based on the smoothing parameter k. More particularly for j ranging between 0 and the length of the truncated vector Vi minus 1 minus k, the gradient may be determined between V[j] and V[j+k]. Each determined gradient may be added to a list Li of gradients for the i-th quantity.

From each list Li of determined gradients, a corresponding set of features may be derived. For example, these features may include one or more of a maximum gradient in Li, a minimum gradient in Li, a mean gradient in Li, and median gradient in Li. Each of these features may also indicate the index at which the feature may be found in Li. For example, the maximum gradient in Li may also indicate an index of Li where this maximum gradient may be found. The gradient-derived features may then be used as input for a supervised machine learning process in order to generate the final trained model. For example, the supervised machine learning process may be a Logistic Regression based model, XGBoost, a DNN, or similar. This trained machine learning model may then be used for identifying suspected anomalies in subsequent values of the time series data.

Figure 3:
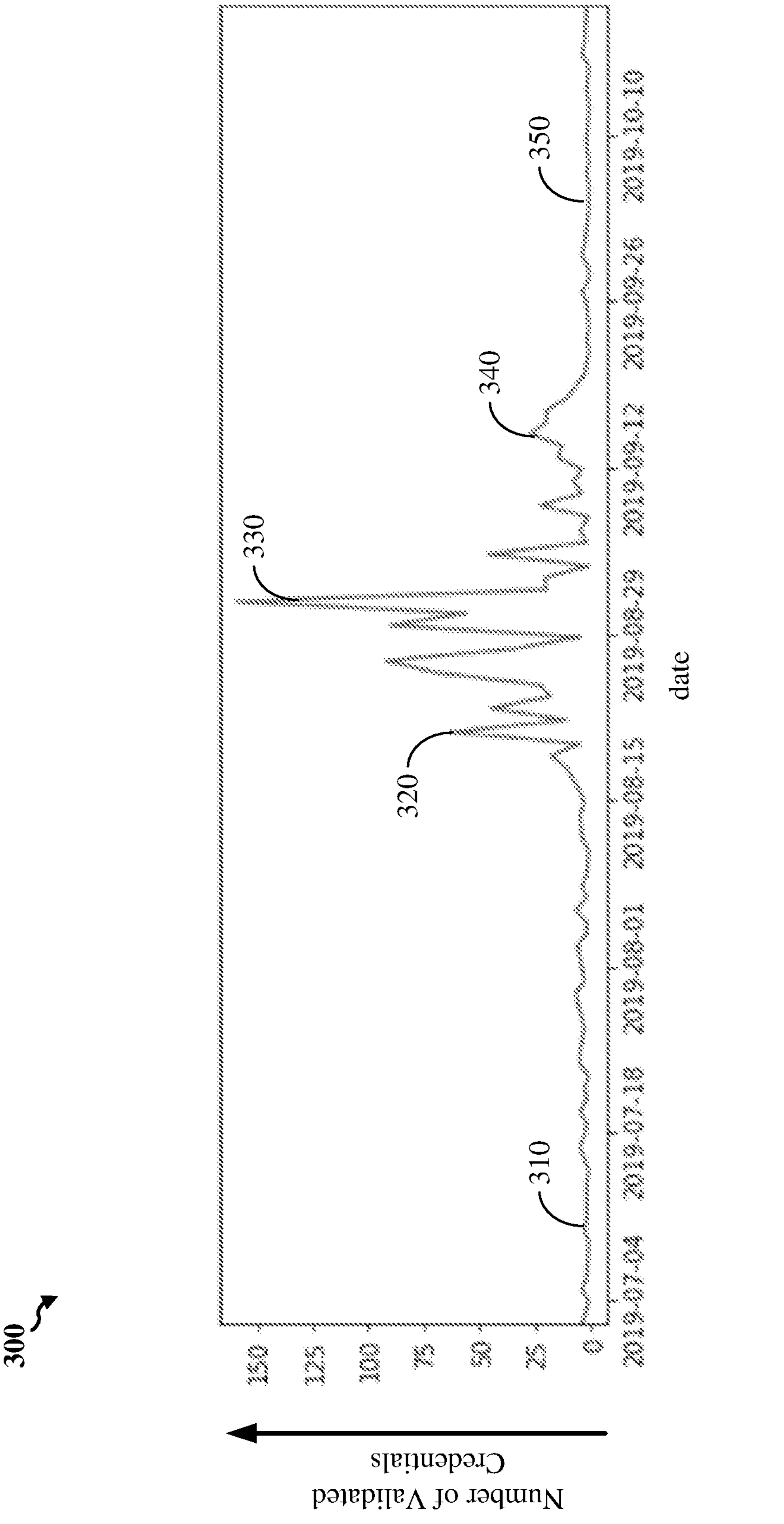
FIG. 3 shows a graph depicting time series data for which the example implementations may identify suspected anomalies.

FIG. 3 shows a graph 300 depicting time series data for which the example implementations may identify suspected anomalies. More particularly, FIG. 3 shows time series data depicting a number of validated credentials per day for a particular website. As discussed above, the example implementations may use features related to gradients of time series data in order to identify suspected anomalies in the time series data. For example, such features may include a maximum gradient of the time series data within a specified lookback period, a mean or median gradient of the time series data within the specified lookback period, and so on. Training the supervised machine learning model to identify anomalies using such features may allow for more explainable identification of anomalies, that is, identification of anomalies in a similar manner to a human expert. Note that the number of validated credentials per day may remain well below 25 for most of the time period represented in FIG. 3, for example around regions 310 and 350, but appears to vary much more dramatically around regions 320, 330 and 340, reaching as high as around 150 validated credentials per day at region 330.

FIG. 3 also shows how appropriate selection of the lookback period n and the smoothing parameter k may be important for usefully deriving features for identifying anomalies in the time series data. Inaccurate calculation of relevant gradients may reduce the efficacy of the gradient-derived features in identifying suspected anomalies in the time series data. For example, a lookback period small enough to capture only the regions 320, 330, and 340, roughly a month, might be insufficient to capture other regions of the time series data where the number of validated credentials is much lower and more consistent, such as the regions 310 and 350. Such a lookback period may result in inaccurate estimations of the mean or median gradient over the lookback period. Similarly, a smoothing parameter which is too large might miss or minimize visibility of the large and variable peaks around regions 320 and 330, reducing the size of the gradients associated with these peaks. For example, if a gradient is calculated from a date just before the peak at region 330 and a date just after that peak, such a gradient may be quite small and irreflective of the steepness of this peak.

Figure 4:
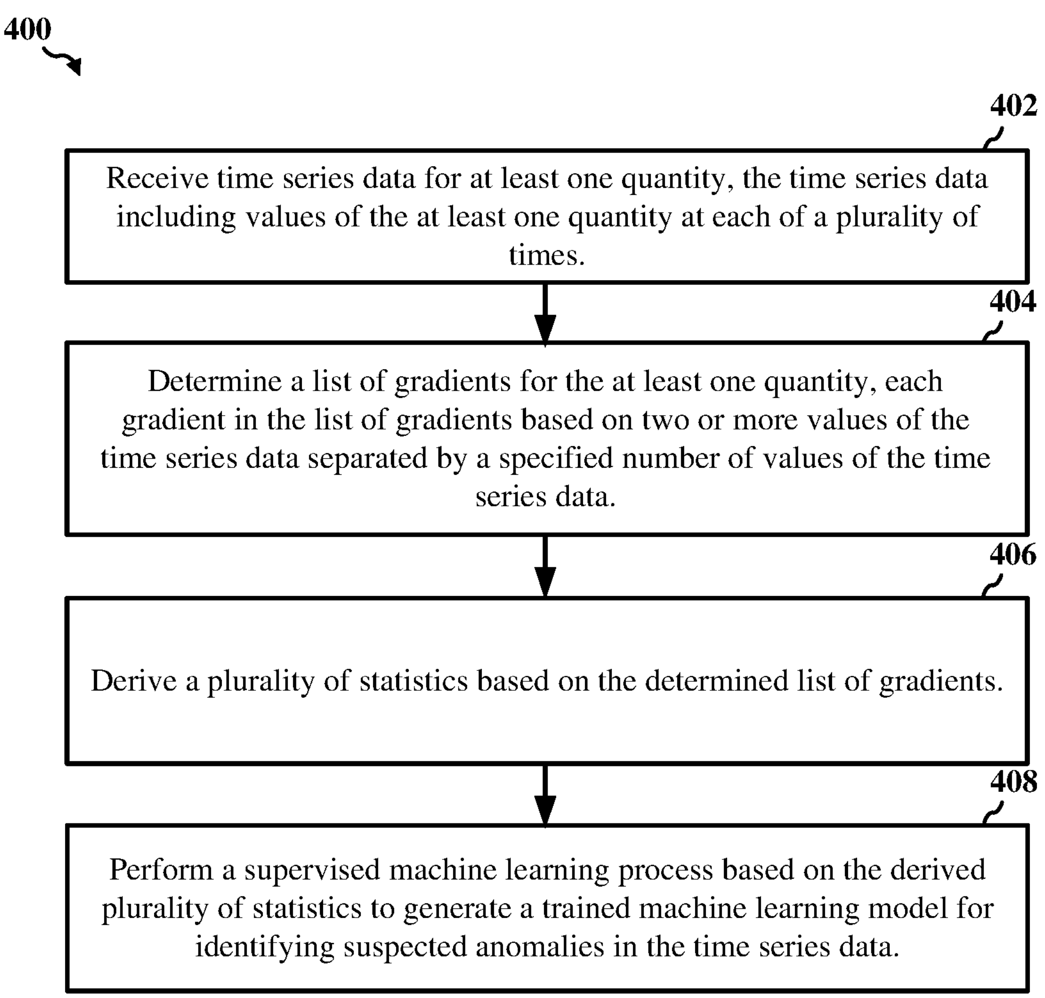
FIG. 4 shows an illustrative flow chart depicting an example operation for identifying suspected anomalies in time series data, according to some implementations.

FIG. 4 shows an illustrative flow chart depicting an example operation 400 for identifying suspected anomalies in time series data, according to some implementations. The example operation 400 may be performed by one or more processors of a computing device including or associated with one or more machine learning models, such as the time series anomaly detection system 100 of FIG. 1. It is to be understood that the example operation 400 may be performed by any suitable systems, computers, or servers.

At block 402, the time series anomaly detection system 100 receives time series data for at least one quantity, where the time series data include values of the at least one quantity at each of a plurality of times. At block 404, the time series anomaly detection system 100 determines a list of gradients for the at least one quantity, each gradient in the list of gradients based on two or more values of the time series data separated by a specified number of values of the time series data. At block 406, the time series anomaly detection system 100 derives a plurality of statistics based on the determined list of gradients. At block 408, the time series anomaly detection system 100 performs a supervised machine learning process based on the derived plurality of statistics to generate a trained machine learning model for identifying suspected anomalies in the time series data.

In some aspects, the operation 400 may also include identifying one or more suspected anomalies in subsequent values of the time series data using the trained machine learning model.

In some aspects, the time series includes a numeric vector including a plurality of indices, where each index contains a value of the time series data at a different time of the plurality of times.

In some aspects, the operation 400 also includes selecting one or more parameters for determining the list of gradients, where the one or more parameters are selected using one or more machine learning processes. In some aspects, the one or more parameters include a lookback period specifying a number of values of the time series data upon which the list of gradients is to be based. In some aspects, the one or more parameters include the specified number of values of the time series data. In some aspects, initial values of the one or more parameters are selected using a supervised machine learning process based on a first set of training data, and the initial values of the one or more parameters are subsequently tuned using one or more tuning techniques.

In some aspects, the plurality of statistics include one or more of a maximum gradient of the list of gradients, a minimum gradient of the list of gradients, a mean gradient of the list of gradients, a median gradient of the list of gradients, an index of the maximum gradient of the list of gradients, and an index of the minimum gradient of the list of gradients.

In some aspects, the at least one quantity comprises an internet protocol (IP) address, a device identifier, or a geographic location.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

What is claimed is:

1. A method of identifying suspected anomalies in login attempts to an online account associated with a user, the method performed by a computing device associated with one or more machine learning models and comprising:

receiving, over a communications network associated with the online account, time series data for the login attempts to the online account, the time series data including values of an internet protocol (IP) address or a device identifier associated with the login attempts to the online account at each of a plurality of times;

determining a lookback period for the time series data, the lookback period indicating a number of most recent values of the time series data to be examined for the suspected anomalies;

determining a smoothing factor for the time series data, the smoothing factor indicating a time period based on a specified number of values of the time series data;

determining a list of gradients for the time series data, each gradient in the list of gradients based on a difference between two values of the time series data corresponding to the lookback period and separated by the specified number of values of the time series data indicated by the smoothing factor;

deriving a plurality of statistics based on the determined list of gradients;

training, using training based on the derived plurality of statistics, a machine learning model;

receiving, over the communications network, additional time series data for subsequent login attempts to the online account, the time series data including subsequent values of the IP address or the device identifier at each of a plurality of subsequent times; and identifying, using the trained machine learning model, one or more suspected anomalies in the subsequent values of the IP address or the device identifier.

2. The method of claim 1, further comprising identifying one or more suspected anomalies in subsequent values of the time series data using the trained machine learning model.

3. The method of claim 1, wherein the time series data comprises a numeric vector including a plurality of indices, each index containing a value of the time series data at a different time of the plurality of times.

4. The method of claim 1, further comprising selecting one or more parameters for determining the list of gradients.

5. The method of claim 4, wherein initial values of the one or more parameters are selected using a supervised machine learning process based on a first set of training data and wherein the initial values of the one or more parameters are subsequently tuned using one or more tuning techniques.

6. The method of claim 1, wherein the plurality of statistics comprise one or more of a maximum gradient of the list of gradients, a minimum gradient of the list of gradients, a mean gradient of the list of gradients, a median gradient of the list of gradients, an index of the maximum gradient of the list of gradients, and an index of the minimum gradient of the list of gradients.

7. The method of claim 1, wherein the values of the time series data further include a geographic location associated with the purchase activities.

8. A system for identifying one or more suspected anomalies in login attempts to an online account associated with a user, the system coupled to one or more machine learning models and comprising:

one or more processors; and a memory storing instructions that, when executed by the one or more processors, cause the system to perform operations comprising:

receiving, over a communications network associated with the online account, time series data for the login attempts to the online account, the time series data including values of an internet protocol (IP) address or a device identifier associated with the login attempts to the online account at each of a plurality of times;

determining a lookback period for the time series data, the lookback period indicating a number of most recent values of the time series data to be examined for the suspected anomalies;

determining a smoothing factor for the time series data, the smoothing factor indicating a time period based on a specified number of values of the time series data;

determining a list of gradients for the time series data, each gradient in the list of gradients based on a difference between two values of the time series data corresponding to the lookback period and separated by the specified number of values of the time series data indicated by the smoothing factor;

deriving a plurality of statistics based on the determined list of gradients;

training, using training data based on the derived plurality of statistics, a machine learning model;

receiving, over the communications network, additional time series data for subsequent login attempts to the online account, the time series data including subsequent values of the IP address or the device identifier at each of a plurality of subsequent times; and identifying, using the trained machine learning model, one or more suspected anomalies in the subsequent values of the IP address or the device identifier.

9. The system of claim 8, wherein the time series data comprises a numeric vector including a plurality of indices, each index containing a value of the time series data at a different time of the plurality of times.

10. The system of claim 8, wherein execution of the instructions causes the system to perform operations further comprising selecting one or more parameters for determining the list of gradients.

11. The system of claim 10, wherein initial values of the one or more parameters are selected using a supervised machine learning process based on a first set of training data and wherein the initial values of the one or more parameters are subsequently tuned using one or more tuning techniques.

12. The system of claim 8, wherein the plurality of statistics comprise one or more of a maximum gradient of the list of gradients,.a minimum gradient of the list of gradients, a mean gradient of the list of gradients, a median gradient of the list of gradients, an index of the maximum gradient of the list of gradients, and an index of the minimum gradient of the list of gradients.

13. The system of claim 8, wherein the values of the time series data further include a geographic location associated with the purchase activities.

14. A non-transitory computer-readable storage medium storing instructions that, when executed by one or more processors of a system coupled to one or more machine learning models, causes the system to identify suspected anomalies in login attempts to an online account associated with a user by performing operations comprising:

receiving, over a communications network associated with the online account, time series data for the login attempts to the online account, the time series data including values of an internet protocol (IP) address or a device identifier associated with the login attempts to the online account at each of a plurality of times;

determining a lookback period for the time series data, the lookback period indicating a number of most recent values of the time series data to be examined for the suspected anomalies;

determining a smoothing factor for the time series data, the smoothing factor indicating a time period based on a specified number of values of the time series data;

determining a list of gradients for the time series data, each gradient in the list of gradients based on a difference between two values of the time series data corresponding to the lookback period and separated by the specified number of values of the time series data indicated by the smoothing factor;

deriving a plurality of statistics based on the determined list of gradients;

training, using training data based on the derived plurality of statistics, a machine learning model;

receiving, over the communications network, additional time series data for subsequent login attempts to the online account, the time series data including subsequent values of the IP address or the device identifier at each of a plurality of subsequent times; and identifying, using the trained machine learning model, one or more suspected anomalies in the subsequent values of the IP address or the device identifier.

15. The method of claim 1, wherein the one or more suspected anomalies indicate a login attempt from an IP address associated with a geographical location to which the user has not traveled.

16. The system of claim 8, wherein the one or more suspected anomalies indicate a login attempt from an IP address associated with a geographical location to which the user has not traveled.

* * * * *